United States Patent
Schneider

(10) Patent No.: US 9,573,195 B2
(45) Date of Patent: Feb. 21, 2017

(54) QUICK-CHANGE SYSTEM FOR A TOOL HOLDER

(71) Applicant: Bilz Werkzeugfabrik GmbH & Co. KG, Ostfildern (DE)

(72) Inventor: Werner Schneider, Altbach (DE)

(73) Assignee: BILZ WERKZEUGFABRIK GMBH & CO. KG, Ostfildern (DE)

( * ) Notice: Subject to any disclaimer, the term of this patent is extended or adjusted under 35 U.S.C. 154(b) by 47 days.

(21) Appl. No.: 14/252,813

(22) Filed: Apr. 15, 2014

(65) Prior Publication Data
US 2014/0312577 A1    Oct. 23, 2014

(30) Foreign Application Priority Data
Apr. 18, 2013    (DE) .................... 10 2013 103 937

(51) Int. Cl.
    *B23B 31/107*    (2006.01)
(52) U.S. Cl.
    CPC ...... *B23B 31/1071* (2013.01); *B23B 2231/024* (2013.01); *B23B 2231/34* (2013.01);
    (Continued)
(58) Field of Classification Search
    CPC ............... B23B 31/1071; B23B 2231/024; Y10T 279/17145; Y10T 279/17752; Y10T 279/17196; Y10T 279/309352; Y10T 409/309464
    See application file for complete search history.

(56) References Cited

U.S. PATENT DOCUMENTS 685,677 A  *  10/1901  Furbish ............... B23B 31/1253
                                                    279/22
2,481,945 A  *  9/1949  Panyard ............ B23B 31/1071
                                                    279/82
(Continued)

FOREIGN PATENT DOCUMENTS

DE    40 41 208 A1    6/1992
DE    36 05 970 C2    9/1994
(Continued)

OTHER PUBLICATIONS

European Search dated May 29, 2015; 7 pp.

*Primary Examiner* — Eric A Gates
*Assistant Examiner* — Paul M Janeski
(74) *Attorney, Agent, or Firm* — Harness, Dickey & Pierce, P.L.C.

(57) ABSTRACT

A quick-change system for a tool holder comprises a machine-side receiving fixture having a hollow-cylindrical extension on which a switching sleeve is displaceably held. Automatic angular alignment of the tool holder upon introduction into the hollow-cylindrical extension of the receiving fixture is enabled by an alignment of the points of the star-shaped end face on the cylindrical holding portion of the tool holder, upon impact against a first set of three balls angularly spaced 120° apart. Once the tool holder has aligned itself in this way, then the first balls make their way into the longitudinal grooves of the cylindrical holding portion, whereby a rotationally fixed coupling is achieved. Upon the further insertion into the hollow-cylindrical extension, an axial securement finally occurs when a second set of three balls are displaced radially inward into associated depressions on the cylindrical holding portion.

18 Claims, 4 Drawing Sheets

(52) U.S. Cl.
CPC .................. *Y10T 279/17145* (2015.01); *Y10T 279/17196* (2015.01); *Y10T 279/17752* (2015.01); *Y10T 409/309464* (2015.01)

(56) References Cited

U.S. PATENT DOCUMENTS

| | | | | |
|---|---|---|---|---|
| 2,807,473 | A * | 9/1957 | Kiehne | B23B 31/1071 |
| | | | | 279/75 |
| 3,583,715 | A * | 6/1971 | Jahrl | B23B 31/1071 |
| | | | | 279/75 |
| 3,788,658 | A * | 1/1974 | Benjamin | B23B 31/06 |
| | | | | 279/155 |
| 6,935,637 | B2 * | 8/2005 | Cantlon | B23B 31/06 |
| | | | | 279/155 |
| 7,740,249 | B1 * | 6/2010 | Gao | B23B 31/1071 |
| | | | | 279/22 |
| 2009/0107304 | A1 * | 4/2009 | Chiang | B25B 15/001 |
| | | | | 81/429 |
| 2009/0160138 | A1 * | 6/2009 | Bohne | B23B 31/1071 |
| | | | | 279/30 |
| 2010/0207335 | A1 * | 8/2010 | Lin | B25B 15/001 |
| | | | | 279/22 |
| 2012/0319398 | A1 * | 12/2012 | Schweizer | B30B 15/026 |
| | | | | 285/308 |
| 2012/0319399 | A1 * | 12/2012 | Schweizer | B23B 31/1071 |
| | | | | 285/313 |

FOREIGN PATENT DOCUMENTS

| | | |
|---|---|---|
| DE | 199 15 821 C2 | 10/2002 |
| EP | 0 206 612 | 12/1986 |
| EP | 1 930 106 A2 | 6/2008 |
| JP | 4-101703 | 4/1992 |
| JP | 5-8106 | 1/1993 |

* cited by examiner

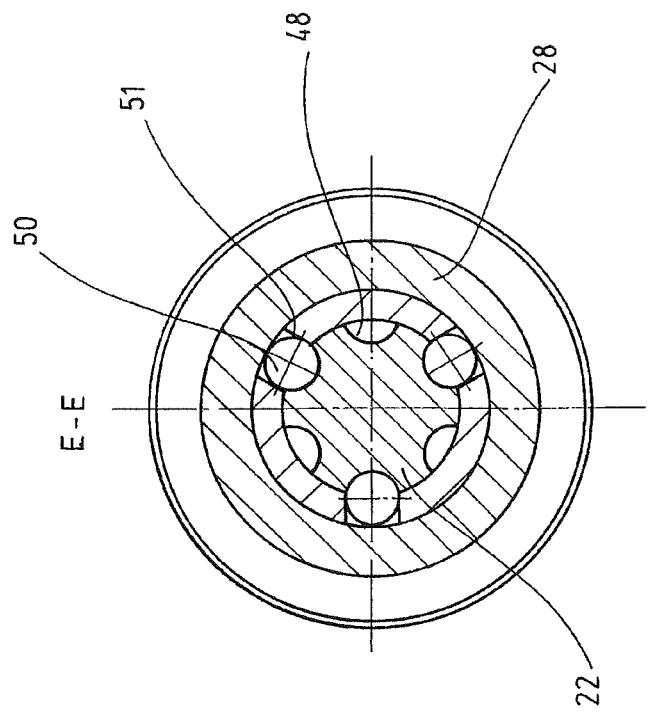
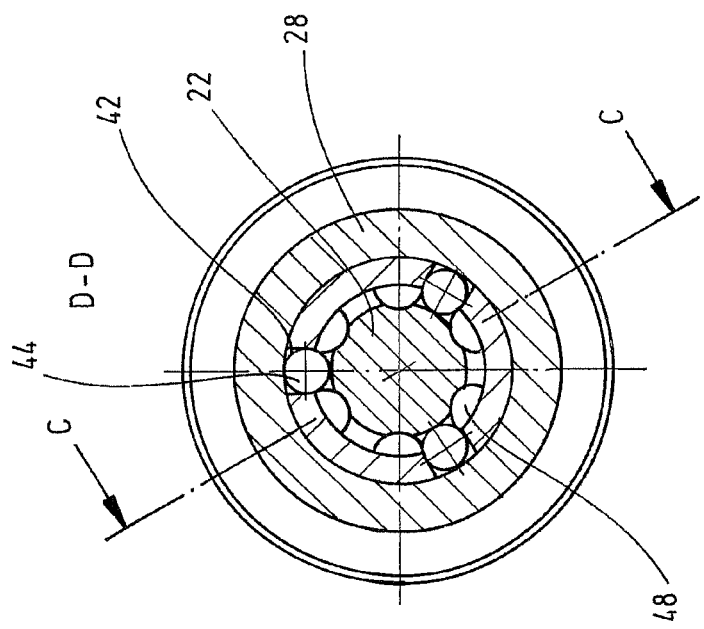

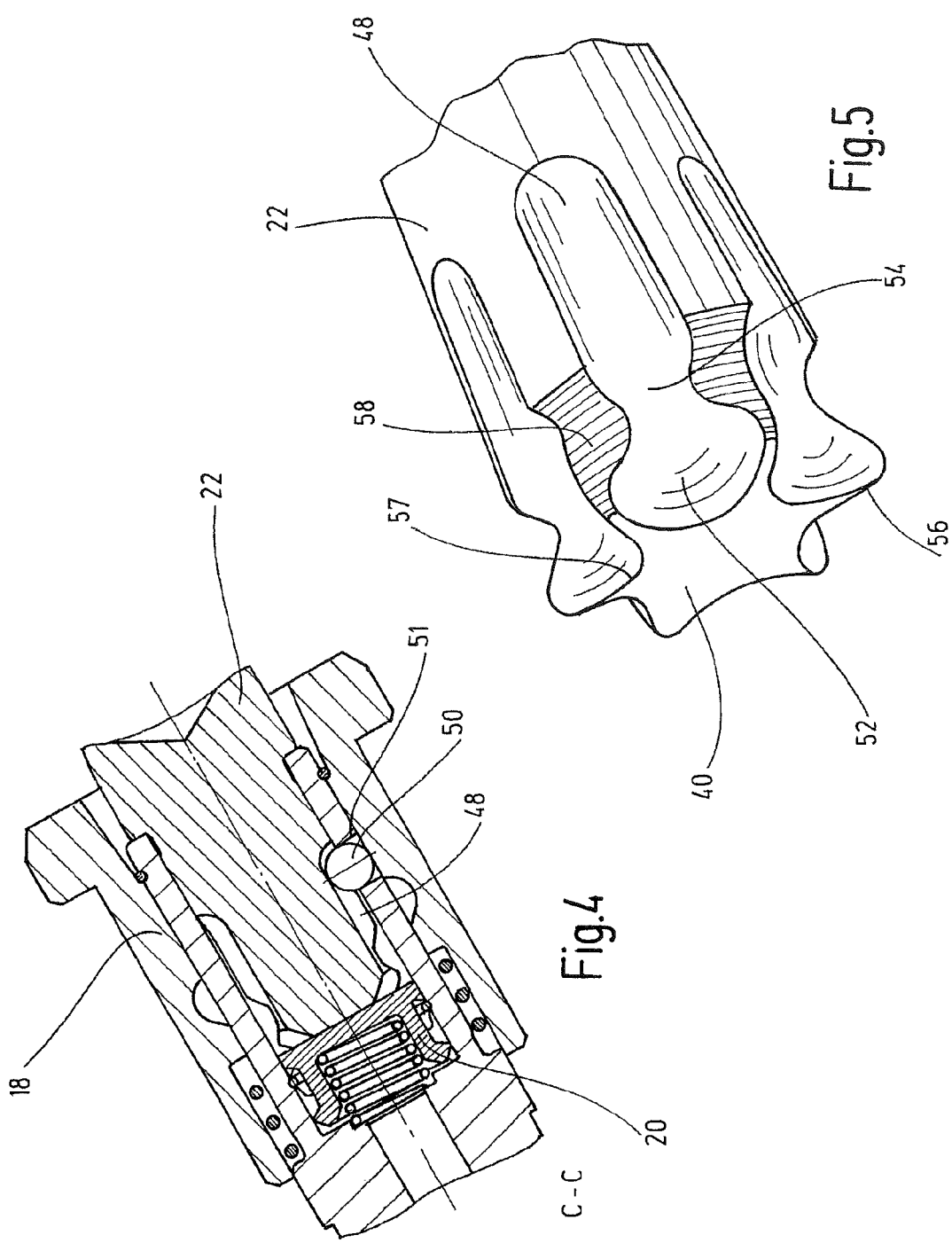

QUICK-CHANGE SYSTEM FOR A TOOL HOLDER

CROSS-REFERENCES TO RELATED APPLICATIONS

This application claims priority from German patent application 10 2013 103 937.5, filed on Apr. 18, 2013. The entire content of this priority application is incorporated herein by reference.

BACKGROUND OF THE INVENTION

The invention relates to a quick-change system for a tool holder, comprising a machine-side receiving fixture to which a tool holder can be secured.

In a quick-change system for a tool holder, a tool holder, which is configured to receive a tool, for instance a milling tool, can be detachably fastened to a machine-side receiving fixture. In this way, various tools already fastened in a tool holder can be fastened to the machine-side receiving fixture by means of a changer.

In many cases, a robot is used for the handling of the tool holder.

In previous systems, it was necessary for the tool holder to be introduced into a suitable recess on the receiving fixture in order to thereby ensure an accurate angular alignment. To this end, a combination of a driving web and a groove or a combination of a feather key and a groove, for instance, has hitherto been used.

This requires, however, that either the tool changer, i.e. the robot, for example, by itself guarantees an accurate angular alignment of the tool holder in order to meet the predefined angular position, or else the tool holder is firstly introduced into the associated depression of the receiving fixture and is then rotated to the point where, for instance, the driving web and the groove are in mutual alignment.

In the first case, a very precise robot design and low flexibility are necessary, which leads to higher robot costs. In the second case, a significantly more complicated movement mechanism and a higher time requirement in the tool change are obtained.

SUMMARY OF THE INVENTION

In view of this, it is a first object of the invention is to disclose a quick-change system for a tool holder, which allows for a correct positioning of the tool holder on a machine-side receiving fixture without the necessity of a prior angular alignment.

It is a second object of the invention to disclose a quick-change system for a tool holder, which is simple and easy to manufacture.

It is a third object of the invention to disclose a quick-change system for a tool holder, which is highly reliable.

According to one aspect of the invention these and other objects are achieved by a quick-change system for a tool holder, said quick-change system comprising:

a receiving fixture configured for attachment to a tool machine, said receiving fixture having a hollow-cylindrical extension;

a tool holder attachable releasably to said hollow-cylindrical extension of said receiving fixture;

a switching sleeve held displaceably on said hollow-cylindrical extension;

first balls being held in said hollow-cylindrical extension;

second balls being held in said hollow-cylindrical extension axially and angularly offset to said first balls;

a cylindrical holding portion provided on said tool holder and having an end face on a side facing said receiving fixture, said end face comprising a plurality of outer points arranged in regular angular intervals defining a plurality of adjacent pairs of points;

a plurality of longitudinal grooves provided on said cylindrical portion, said longitudinal grooves cooperating with said first balls for securing said tool holder fixed against rotation;

a plurality of first depressions, each of said first depressions being defined between one adjacent pair of points, said first depressions being configured for receiving and guiding said first balls into said longitudinal grooves upon inserting said tool holder into said hollow-cylindrical extension;

a plurality of second depressions provided on said cylindrical holding portion and cooperating with said second balls for fixing said tool holder in an axial direction; and a plurality of third depressions provided on said switching sleeve, each of said third depressions being assigned to one of said second balls, said third depressions allowing a radial veering of said second balls in an outward direction upon alignment with said second balls;

wherein said points of said end face are configured for angularly aligning said tool holder to said first balls upon inserting said holding portion into said hollow-cylindrical extension.

The object of the invention is thereby fully achieved.

According to the invention, an automatic angular alignment of the tool holder upon introduction into the hollow-cylindrical extension of the receiving fixture is enabled by an alignment of the points of the star-shaped end face upon impact against the first balls. Once the tool holder has aligned itself in this way, then the first balls make their way into the longitudinal grooves of the cylindrical holding portion, whereby a rotationally fixed coupling is achieved. Upon the further insertion into the hollow-cylindrical extension, an axial securement finally occurs when the second balls make their way into their associated depressions on the cylindrical holding portion.

In a preferred embodiment, the tool holder can be configured as a collet chuck. However, any other optional embodiments of the tool holder are also conceivable in association with the invention.

In a preferred refinement of the invention, six longitudinal grooves are arranged at regular angular intervals on the cylindrical holding portion, wherein the second depressions are respectively disposed in the region between two adjacent longitudinal grooves adjoining the points.

An optimal dimensioning for a diameter range in the order of magnitude of 15 mm is herein obtained. Self-evidently, more or fewer longitudinal grooves and second depressions can naturally also be provided.

According to a further embodiment of the invention, respectively three first balls and three second balls are provided, which balls cooperate with the longitudinal grooves and the second depressions respectively.

In this way, a secure fixing is guaranteed.

According to a further embodiment of the invention, the switching sleeve is spring-loaded into a locking position, in which the second balls, once the tool holder is inserted, are locked in place in the second depressions.

An automatic locking of the tool holder in the axial direction is thereby enabled.

According to a further embodiment of the invention, the first depressions are configured substantially in the shape of a spherical segment for the partial reception of the first balls and merge respectively via an associated transition portion into one of the longitudinal grooves.

In this way, the alignment of the cylindrical holding portion to the first balls is facilitated. When the star-shaped end face abuts against the first balls, the cylindrical holding portion moves angularly such that the first balls make their way into the associated first depressions and then, via the associated transition portion, into the longitudinal grooves.

According to a further embodiment of the invention, a central, spring-loaded locking ring, which forces the second balls radially outwards into the associated depressions of the switching sleeve and, if no tool holder is inserted, locks them in this position, is provided in the receiving fixture.

According to a refinement of this embodiment, the locking ring is arranged such that it yields under pressure to the end face of the cylindrical holding portion in the axial direction, so that the second balls make their way into the second depressions and the switching sleeve moves under the action of its pretension into a locking position in which the second balls are locked in place in the second depressions.

As a result of these measures, the second balls, prior to the introduction of the tool holder and initially by the locking ring, can be held in a suitable position recessed in the locking ring, until finally the end face of the cylindrical holding portion abuts against the locking ring. This results in yielding of the locking ring and further causes the second balls, under the action of the pretension of the switching sleeve, to make their way into the second depressions, and so the tool holder is finally held locked in the axial direction.

With the above-described quick-change system, an automatic angular adjustment of the tool holder is guaranteed. This presupposes, however, that the gripper or robot which is used has a corresponding flexibility of about ±30° (where six longitudinal grooves are used). This is the case with many robot arms. However, there are also comparatively rigid systems which have no such flexibility.

In this event, the tool holder can have a twistable receiving fixture for a gripper.

An appropriate angular adjustment of the receiving fixture in relation to the gripper is thus enabled if the tool holder, when introduced into the hollow-cylindrical extension, is aligned to the first balls.

To this end, a gripper collar can be twistably secured to the tool holder, for instance, with a gripper groove.

This can realized, for instance, by means of a ring, which is rotatably held on an outer surface of the tool holder and is secured in the axial direction.

Self-evidently, the above-stated features and the features which are yet to be set out below can be used not only in the respectively stated combination, but also in other combinations or in isolation, without departing from the scope of the invention.

BRIEF DESCRIPTION OF THE DRAWINGS

Further features and advantages of the invention emerge from the following description of preferred illustrative embodiments with reference to the drawing, wherein:

FIG. 2 shows a section along the line D-D according to FIG. 1;

FIG. 3 shows a section along the line E-E according to FIG. 1;

FIG. 4 shows a partial longitudinal section along the line C-C according to FIG. 2;

FIG. 5 shows an enlarged perspective partial view of the cylindrical holding portion in a view obliquely from the front.

DESCRIPTION OF PREFERRED EMBODIMENTS

Figure 1:
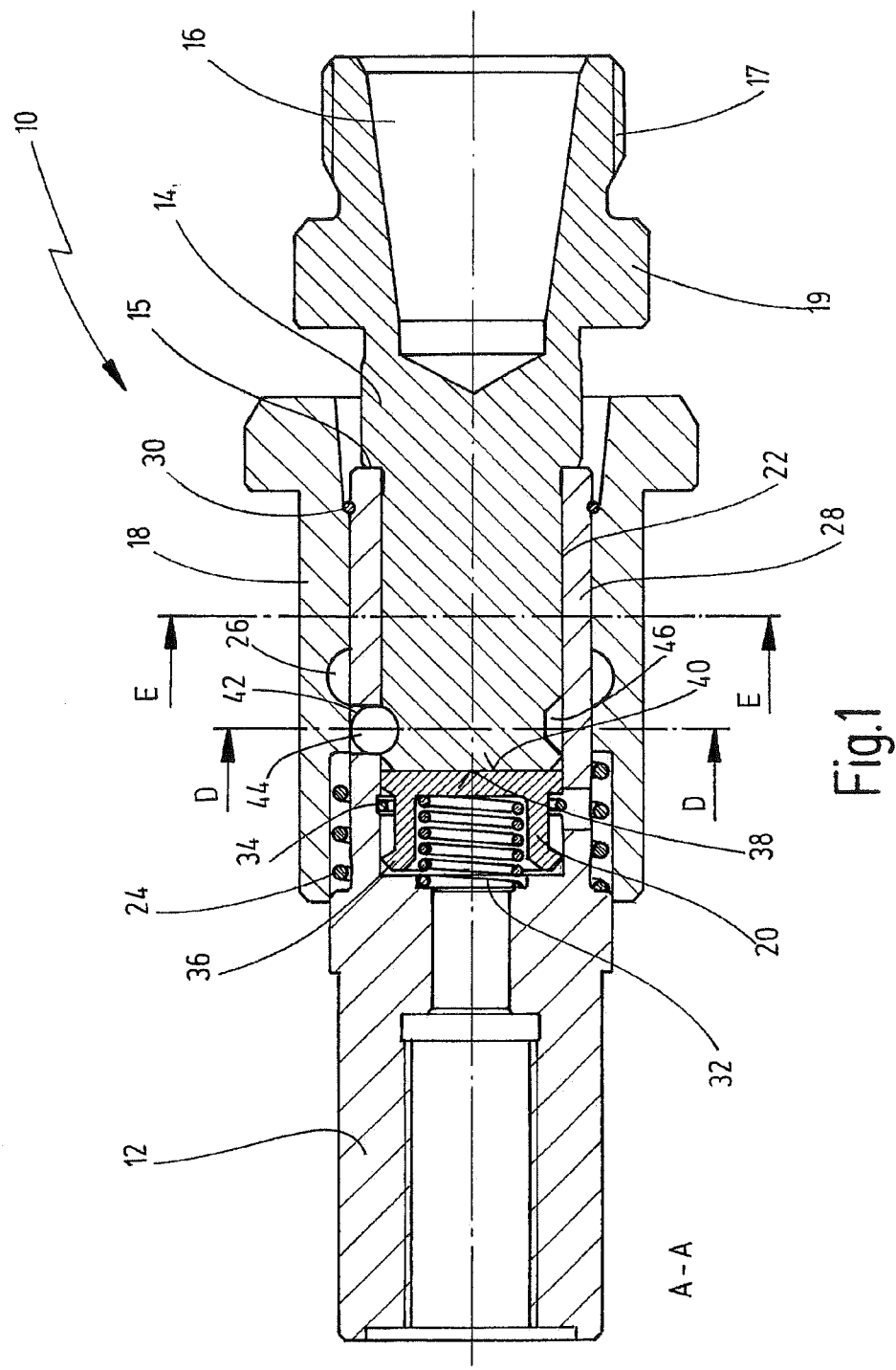
FIG. 1 shows a first embodiment of a quick-change system according to the invention in longitudinal section, wherein a tool holder in the form of a collet chuck is fully inserted in a hollow-cylindrical extension of a machine-side receiving fixture and locked in place there.

In FIG. 1, a quick-change system according to the invention is denoted in its entirety by the numeral 10.

The quick-change system 10 has a machine-side receiving fixture 12 having a cylindrical extension 28, on which a switching sleeve 18 is held in a spring-loaded manner.

Into the cavity enclosed by the hollow-cylindrical extension 28, a tool holder 14 in the form of a collet chuck can be inserted with a cylindrical holding portion 22 and locked in place there, as is explained in greater detail below.

The tool holder 14 has at its outer end a clamping cone 16 and an external thread 17, which is followed by a collar 19.

The collar 19 serves, for instance, for handling purposes with the aid of a robot or another changer. Inserted in the clamping cone 16 is a tool, which can additionally be secured by a screwed-on nut.

The inventive embodiment of the quick-change system 10 enables the tool holder 14, when introduced with its holding portion 22 into the hollow-cylindrical extension 28, to be automatically aligned into a predetermined angular position and finally to be locked in place once its axial end position is reached.

Three second balls 44 (cf. FIGS. 1 and 2) in total, which are held mutually offset by respectively 120° in radial recesses of the hollow-cylindrical extension 28 and which engage in associated second depressions 46 at the end of the cylindrical holding portion 22, are used for the axial locking. In the locking position shown in FIG. 1, the second balls 44 are prevented by the inner surface of the switching sleeve 18 from deflection outwards, so that a locking is obtained. In the locking position, the tool holder 14 bears with a collar 15 adjoining the outer end of the cylindrical holding portion 22 against the outer end of the hollow-cylindrical extension 28.

The switching sleeve 18 is pretensioned into the locking position by a spring element 24 and is in its end position limited by abutment against a circlip 30.

From this locking position, the switching sleeve 18 can be moved counter to the force of a spring element 24, designed as a helical spring, in the direction of the receiving fixture 12. This leads to the alignment of recesses 26 on the inner surface of the switching sleeve 18 with the associated second balls 44, so that these, when the tool holder 14 is withdrawn from the hollow-cylindrical extension 28, can veer radially outwards into the depressions 26, so that the axial locking of the tool holder 14 is lifted and this can easily be withdrawn outwards.

A central locking ring 20, which is accommodated at the machine-side end of the hollow-cylindrical extension 28 and is pretensioned in the outward direction by a spring element 32 in the form of a helical spring, cooperates with the second balls 44. The locking ring 20 has a cup-shaped basic form and, in the locking position shown in FIG. 1, bears with its outer end face 38 against the end face 40 of the cylindrical holding portion 22.

If the switching sleeve 18 is now moved counter to the action of its spring tension in the direction of the receiving fixture 12, so that the second balls 44 are released and make their way into the associated depressions 26 on the switching sleeve 16, then, upon the withdrawal of the tool holder 14, the locking ring 20 at the same time moves outwards under the action of its spring tension and locks the second balls 44 in the depressions 26. The switching sleeve 18 is thus held in this position and locked in place by the locking ring 20. The locking ring 20 is here in its axial end position, since it abuts with a machine-side shoulder 36 against a circlip 34.

As can be seen in greater detail from FIGS. 3 and 4, three first balls 50 are accommodated in associated radial recesses 51 of the hollow-cylindrical shoulder 28, axially offset to the second balls 44 and angularly offset thereto by a measure of 30°. The first balls 50 engage in associated longitudinal grooves 48 on the cylindrical holding portion 22 and thus allow a torque transmission from the receiving fixture 12 to the tool holder 14.

In order to guarantee an angular alignment when the tool holder 14 is introduced with its cylindrical holding portion 22 into the hollow-cylindrical extension 28, the end face 40 of the cylindrical holding portion 22 is configured in the shape of a star, having six points 56 in total, wherein respectively two adjacent points 56 are connected to each other by curvatures 57 running concavely outwards. As can be seen in greater detail from FIG. 5, such a curvature 57 limits respectively a first depression 52, which is curved substantially in the shape of a spherical segment and which merges via a transition portion 54 into one of the longitudinal grooves 48.

Between respectively two adjacent longitudinal grooves 48 is arranged a second depression 58, which directly adjoins one of the points 56.

With an arrangement of this type, the angular alignment of the tool holder 14 upon introduction into the hollow-cylindrical extension 28 is achieved as follows:

Firstly, the end face 40 abuts with its points 56 against the first balls 50, which leads to the cylindrical holding portion 22 being angularly twisted such that the first balls 50 make their way into the first depressions 52. Upon further insertion into the hollow-cylindrical extension 28, the first balls 50 make their way via the adjoining transition portions 54 into their associated longitudinal grooves 48, so that the position shown in FIG. 4 is reached.

As soon as the end face 40 abuts against the end face 38 of the locking ring 20, this is axially displaced against the action of its spring force, whereby the second balls 44 make their way under the action of the pretension of the switching sleeve 18 into the second depressions 46, as soon as these are aligned with the second recesses 42 on the hollow-cylindrical extension 28. As soon as the second balls 44 are fully released from the depressions 26 of the switching sleeve 18, the switching sleeve 18 moves under the action of its spring tension into the end position shown in FIGS. 1 and 4, whereby the second balls 44 are locked in place in the associated second depressions 42 and thus the tool holder 14 is secured in the axial direction. An axially secured and rotationally fixed connection of the tool holder 14 to the receiving fixture 12 is thus achieved.

Should the tool holder 14 be removed again from the receiving fixture 12, for a tool change, for instance, then the switching sleeve 18 is moved counter to the action of its spring element 24 until the depressions 26 are aligned with the second balls 44, so that, upon the withdrawal, the second balls 44 make their way into the depressions 26 and, as already described above, the switching sleeve 18 is held in this position and the second balls 44 are secured in this position by the locking ring 20.

Figure 6:
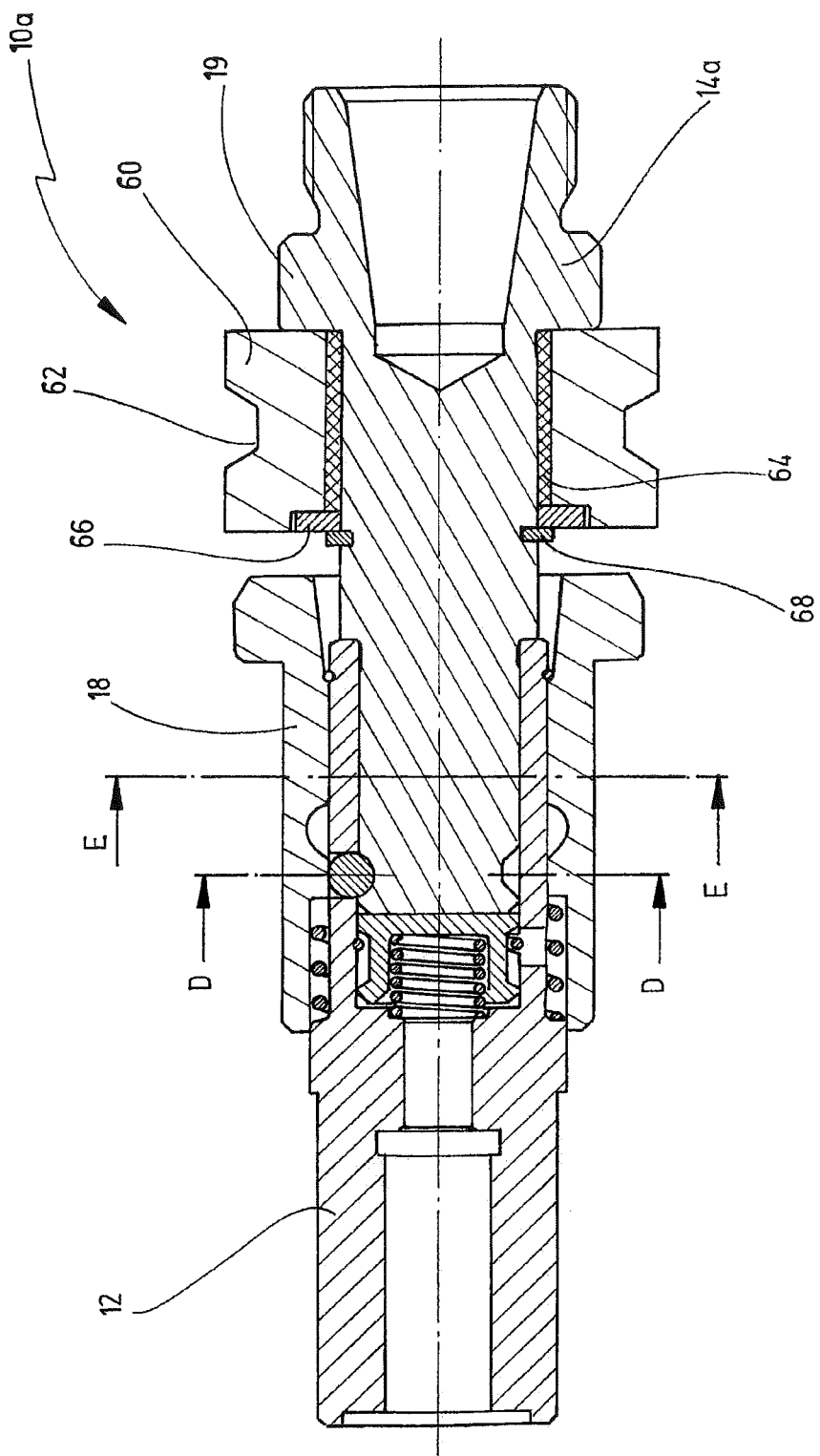
FIG. 6 shows a modification of the embodiment according to FIG. 1, wherein the collet chuck additionally has a twistable receiving fixture for a gripper.

A modification of the embodiment according to FIG. 1 is represented in FIG. 6 and denoted in its entirety by 10a.

The structure of the quick-change system 10a fully corresponds to the previously described structure of the quick-change system 10, with the sole difference that a gripper collar 60 is additionally rotatably secured on the tool holder 14a with a gripper groove 82. To this end, the gripper collar 60 can be rotatably secured, for instance by means of a ring 64, on an outer surface of the tool holder 14a, adjoining the collar 19. The gripper collar 60 directly adjoins the collar 19 and is axially secured by a fastening ring 66 by means of a circlip 68.

Since the gripper collar 60 allows a relative rotation to the tool holder 14a, such an embodiment can be used insofar as the gripper or robot which is used does not allow sufficient angular flexibility to allow a self-alignment of the tool holder 14a upon the introduction into the hollow-cylindrical extension 28.

In FIG. 6, corresponding reference numerals as in FIG. 1 are otherwise used for corresponding parts.

What is claimed is:

1. A quick-change system for a tool holder, said quick-change system comprising:
a receiving fixture defining a rotational axis and configured for attachment to a tool machine, said receiving fixture having a hollow-cylindrical extension;
a tool holder attachable releasably to said hollow-cylindrical extension of said receiving fixture;
a switching sleeve held displaceably on said hollow-cylindrical extension, said switching sleeve being spring-loaded into a locking position;
first balls being held in said hollow-cylindrical extension;
second balls being held in said hollow-cylindrical extension axially and angularly offset to said first balls;
a cylindrical holding portion provided on said tool holder and having a substantially star-shaped end face on a side facing said receiving fixture, said substantially star-shaped end face comprising a plurality of outer points arranged in regular angular intervals defining a plurality of adjacent pairs of points;
a plurality of longitudinal grooves provided on said cylindrical holding portion, said longitudinal grooves cooperating with said first balls for securing said tool holder fixed against rotation relative to said receiving fixture;
a plurality of first depressions, each of said first depressions being defined between one adjacent pair of points, said first depressions being configured for receiving and guiding said first balls into said longitudinal grooves upon inserting said cylindrical holding portion of said tool holder into said hollow-cylindrical extension;
a plurality of second depressions provided on said cylindrical holding portion and cooperating with said second balls for fixing said tool holder in an axial direction; and
a plurality of third depressions provided on said switching sleeve, each of said third depressions being assigned to one of said second balls, said third depressions allowing a radial movement of said second balls in an outward direction upon axial movement of said switching sleeve enabling alignment of said third depressions with said second balls;
wherein said points of said end face are configured for angularly aligning said longitudinal grooves on said tool holder with said first balls solely upon axial insertion of said cylindrical holding portion into said hollow-cylindrical extension; and wherein each of said first depressions is configured substantially in the shape of a spherical segment for partially receiving one of said first balls.

2. The quick-change system of claim 1, wherein six of said longitudinal grooves are arranged at regular angular intervals on said cylindrical holding portion.

3. The quick-change system of claim 1, wherein said longitudinal grooves define a plurality of adjacent pairs of longitudinal grooves, wherein each of said second depressions is disposed between one of said adjacent pairs of longitudinal grooves adjoining two of said points.

4. The quick-change system of claim 3, further comprising a central locking ring being biased for forcing said second balls radially outwards into associated depressions of said switching sleeve, and for locking said second balls within said second depressions, if no tool holder is inserted.

5. The quick-change system of claim 4, wherein said locking ring is configured spring-loaded so as to allow axial movement upon exerting pressure onto said end face of said cylindrical holding portion, thereby allowing said second balls to move into said second depressions and said switching sleeve to move into a locking position, wherein said second balls are locked in place in said second depressions.

6. The quick-change system of claim 1, comprising three of said first balls cooperating with said longitudinal grooves.

7. The quick-change system of claim 1, comprising three of said second balls cooperating with said second depressions.

8. The quick-change system of claim 1, further comprising a plurality of transition portions, wherein each of said first depressions merges via one of said transition portions into one of said longitudinal grooves.

9. The quick-change system of claim 1, further comprising a central locking ring being biased for forcing said second balls radially outwards into associated depressions of said switching sleeve, and for locking said second balls within said second depressions, if no tool holder is inserted.

10. The quick-change system of claim 9, wherein said locking ring is configured spring-loaded so as to allow axial movement upon exerting pressure onto said end face of said cylindrical holding portion, thereby allowing said second balls to move into said second depressions and said switching sleeve to move into a locking position, wherein said second balls are locked in place in said second depressions.

11. The quick-change system of claim 1, wherein said tool holder further comprises a twistable receiving fixture for a gripper.

12. The quick-change system of claim 11, further comprising a gripper collar having a gripper groove being twistably secured to said tool holder.

13. The quick-change system of claim 12, further comprising a ring for securing said gripper collar rotatably and axially fixed on an outer surface of said tool holder.

14. A quick-change system for a tool holder, said quick-change system comprising:
a receiving fixture defining a rotational axis and configured for attachment to a tool machine, said receiving fixture having a hollow-cylindrical extension;
a tool holder attachable releasably to said hollow-cylindrical extension of said receiving fixture;
a switching sleeve held displaceably on said hollow-cylindrical extension;
first balls being held in said hollow-cylindrical extension;
second balls being held in said hollow-cylindrical extension;
a cylindrical holding portion provided on said tool holder and having an end face on a side facing said receiving fixture, said end face comprising a plurality of outer points arranged in regular angular intervals defining a plurality of adjacent pairs of points;
a plurality of longitudinal grooves provided on said cylindrical holding portion, said longitudinal grooves cooperating with said first balls for securing said tool holder fixed against rotation relative to said receiving fixture;
a plurality of first depressions, each of said first depressions being defined between one adjacent pair of points, said first depressions being configured for receiving and guiding said first balls into said longitudinal grooves upon inserting said cylindrical holding portion of said tool holder into said hollow-cylindrical extension;
a plurality of second depressions provided on said cylindrical holding portion and cooperating with said second balls for fixing said tool holder in an axial direction; and
a plurality of third depressions provided on said switching sleeve, each of said third depressions being assigned to one of said second balls, said third depressions allowing a radial movement of said second balls in an outward direction upon axial movement of said switching sleeve enabling alignment of said third depressions with said second balls;
wherein said points of said end face are configured for angularly aligning said longitudinal grooves on said tool holder with said first balls solely upon axial insertion of said cylindrical holding portion into said hollow-cylindrical extension; and
wherein each of said first depressions is configured substantially in the shape of a spherical segment for partially receiving one of said first balls.

15. The quick-change system of claim 14, wherein said end face of said cylindrical holding portion is substantially star-shaped.

16. The quick-change system of claim 14, wherein said switching sleeve is spring-loaded into a locking position, wherein said second balls are locked in place in said second depressions, upon insertion of said tool holder.

17. The quick-change system of claim 14, further comprising a central locking ring being biased for forcing said second balls radially outwards into associated depressions of said switching sleeve, and for locking said second balls within said second depressions, if no tool holder is inserted.

18. The quick-change system of claim 14, wherein said locking ring is configured spring-loaded so as to allow axial movement upon exerting pressure onto said end face of said cylindrical holding portion, thereby allowing said second balls to move into said second depressions and said switching sleeve to move into a locking position, wherein said second balls are locked in place in said second depressions.

* * * * *